US012608995B2

(12) United States Patent
Banas et al.

(10) Patent No.: US 12,608,995 B2
(45) Date of Patent: Apr. 21, 2026

(54) GAMING MACHINE HAVING ENHANCED EMOTIVE LIGHTING

(71) Applicant: LNW Gaming, Inc., Las Vegas, NV (US)

(72) Inventors: Nicholas Banas, Henderson, NV (US); Jerad Deitrick, Las Vegas, NV (US); Kay Vetter, Reno, NV (US); Michael Corristine, Bolton (GB)

(73) Assignee: LNW Gaming, Inc., Las Vegas, NV (US)

( * ) Notice: Subject to any disclaimer, the term of this patent is extended or adjusted under 35 U.S.C. 154(b) by 202 days.

(21) Appl. No.: 18/343,404

(22) Filed: Jun. 28, 2023

(65) Prior Publication Data

US 2024/0021043 A1 Jan. 18, 2024

Related U.S. Application Data

(60) Provisional application No. 63/389,997, filed on Jul. 18, 2022.

(51) Int. Cl.
*G07F 17/32* (2006.01)
*H05B 45/20* (2020.01)

(52) U.S. Cl.
CPC ......... *G07F 17/3216* (2013.01); *H05B 45/20* (2020.01)

(58) Field of Classification Search
None
See application file for complete search history.

(56) References Cited

U.S. PATENT DOCUMENTS

| | | | | |
|---|---|---|---|---|
| 5,553,859 A | | 9/1996 | Kelly et al. | |
| 5,860,648 A | | 1/1999 | Petermeier et al. | |
| 6,514,140 B1 | | 2/2003 | Storch | |
| 6,592,454 B2 | | 7/2003 | Libby et al. | |
| 7,452,276 B2 | | 11/2008 | Loose et al. | |
| 7,753,781 B2 | | 7/2010 | Storch | |
| 8,096,878 B2 | | 1/2012 | Durham et al. | |
| 8,128,477 B2 | | 3/2012 | Durham et al. | |
| 8,137,182 B2 | | 3/2012 | Kearns et al. | |
| 8,137,183 B2 | | 3/2012 | Kearns et al. | |
| 8,162,751 B2 | | 4/2012 | Kopera et al. | |
| 8,199,370 B2 | | 6/2012 | Irwin, Jr. et al. | |
| 8,235,813 B2 | * | 8/2012 | Cornell | G07F 17/32 463/31 |
| 8,251,795 B2 | | 8/2012 | Durham et al. | |
| 8,282,257 B2 | | 10/2012 | Rasmussen | |
| 8,376,839 B2 | * | 2/2013 | Lesley | G07F 17/34 427/166 |
| 8,439,741 B2 | | 5/2013 | Loose et al. | |
| 8,545,305 B2 | | 10/2013 | Ross et al. | |
| 8,550,898 B2 | | 10/2013 | Kearns et al. | |

(Continued)

*Primary Examiner* — Sunit Pandya

(57) ABSTRACT

Disclosed is a gaming machine including a cabinet with an emotive lighting system coupled to the cabinet and logic circuitry. The emotive lighting system includes a plurality of light transmitting fibers, each end of which is positioned adjacent to a light-emitting device aligned to emit light into its respective fiber end. The light-emitting devices are arranged in an array and the logic circuitry causes each light-emitting device of the array to selectively emit light such that its associated fiber is illuminated. A method of assembling such an emotive lighting system and attaching it to the gaming machine is also disclosed.

21 Claims, 15 Drawing Sheets

(56) References Cited

U.S. PATENT DOCUMENTS

| | | | |
|---|---|---|---|
| 8,613,667 B2 | 12/2013 | Brunell et al. | |
| 8,638,479 B2 | 1/2014 | Irwin, Jr. et al. | |
| 8,777,757 B2 | 7/2014 | Chudek | |
| 8,814,673 B1 | 8/2014 | Brunell et al. | |
| 8,840,464 B1 | 9/2014 | Brunell et al. | |
| 8,912,727 B1 | 12/2014 | Brunell et al. | |
| 8,968,088 B2 | 3/2015 | Brunell et al. | |
| 8,974,298 B2 | 3/2015 | Kearns et al. | |
| 9,011,247 B2 | 4/2015 | Gronkowski et al. | |
| 9,076,285 B2 | 7/2015 | Loose et al. | |
| 9,087,429 B2 | 7/2015 | Brunell et al. | |
| 9,367,987 B1 | 6/2016 | Brunell et al. | |
| 9,520,018 B2 | 12/2016 | Brunell et al. | |
| 9,547,952 B2 | 1/2017 | Brunell et al. | |
| 9,659,432 B2 | 5/2017 | Castro et al. | |
| 9,659,434 B2 | 5/2017 | Bainbridge et al. | |
| 10,019,868 B2 | 7/2018 | Castro et al. | |
| 10,068,412 B2 | 9/2018 | Brunell et al. | |
| 10,096,202 B2 | 10/2018 | Castro et al. | |
| 10,269,207 B2 | 4/2019 | Gronkowski et al. | |
| 10,643,423 B2 | 5/2020 | Lyons et al. | |
| 10,789,805 B2 | 9/2020 | Castro et al. | |
| 10,984,629 B2 | 4/2021 | Glenn et al. | |
| 11,069,179 B2 * | 7/2021 | Glenn .................... | G02B 6/001 |
| 11,348,400 B2 | 5/2022 | Coon et al. | |
| 2003/0087694 A1 | 5/2003 | Storch | |
| 2003/0157980 A1 | 8/2003 | Loose et al. | |
| 2003/0222398 A1 | 12/2003 | Tastad et al. | |
| 2004/0248642 A1 | 12/2004 | Rothschild | |
| 2005/0261057 A1 | 11/2005 | Bleich et al. | |
| 2007/0010318 A1 | 1/2007 | Rigsby et al. | |
| 2008/0039181 A1 | 2/2008 | Loose et al. | |
| 2008/0039182 A1 | 2/2008 | Loose et al. | |
| 2008/0039213 A1 | 2/2008 | Cornell et al. | |
| 2008/0045333 A1 | 2/2008 | Storch | |
| 2008/0119288 A1 | 5/2008 | Rasmussen | |
| 2008/0188293 A1 | 8/2008 | Rasmussen et al. | |
| 2008/0207303 A1 | 8/2008 | Rasmussen | |
| 2009/0059316 A1 | 3/2009 | Irwin, Jr. et al. | |
| 2009/0138133 A1 | 5/2009 | Buchholz et al. | |
| 2009/0181755 A1 | 7/2009 | Gagner et al. | |
| 2009/0280888 A1 | 11/2009 | Durham et al. | |
| 2009/0312095 A1 | 12/2009 | Durham et al. | |
| 2010/0004059 A1 | 1/2010 | Kopera et al. | |
| 2010/0048280 A1 | 2/2010 | Kearns et al. | |
| 2010/0048281 A1 | 2/2010 | Kearns et al. | |
| 2011/0070948 A1 | 3/2011 | Bainbridge et al. | |
| 2011/0115413 A1 | 5/2011 | Erickson et al. | |
| 2011/0118034 A1 | 5/2011 | Jaffe et al. | |
| 2011/0201411 A1 | 8/2011 | Lesley et al. | |
| 2011/0281635 A1 | 11/2011 | Loose et al. | |
| 2011/0319152 A1 | 12/2011 | Ross et al. | |
| 2012/0129601 A1 | 5/2012 | Gronkowski et al. | |
| 2012/0157185 A1 | 6/2012 | Kearns et al. | |
| 2012/0178528 A1 * | 7/2012 | Brunell .................. | G07F 17/34 463/31 |
| 2012/0225726 A1 | 9/2012 | Anderson et al. | |
| 2012/0250118 A1 | 10/2012 | Irwin, Jr. et al. | |
| 2013/0135891 A1 * | 5/2013 | Salmon .................... | G02B 6/04 362/559 |
| 2013/0137523 A1 | 5/2013 | Lesley et al. | |
| 2013/0184078 A1 | 7/2013 | Brunell et al. | |
| 2014/0045574 A1 | 2/2014 | Kearns et al. | |
| 2014/0073430 A1 | 3/2014 | Brunell et al. | |
| 2014/0087887 A1 | 3/2014 | Chudek | |
| 2014/0335956 A1 | 11/2014 | Brunell et al. | |
| 2015/0148134 A1 | 5/2015 | Brunell et al. | |
| 2015/0339879 A1 | 11/2015 | Brunell et al. | |
| 2015/0371486 A1 | 12/2015 | Castro et al. | |
| 2016/0292955 A1 | 10/2016 | Gronkowski et al. | |
| 2016/0364941 A1 | 12/2016 | Castro et al. | |
| 2016/0364946 A1 | 12/2016 | Castro et al. | |
| 2018/0108207 A1 | 4/2018 | Lyons et al. | |
| 2018/0225913 A9 | 8/2018 | Gronkowski et al. | |
| 2018/0330568 A1 * | 11/2018 | Glenn .................. | H05B 47/155 |
| 2019/0043304 A1 * | 2/2019 | Castro .................. | G02B 5/0278 |
| 2020/0111295 A1 * | 4/2020 | Glenn .................. | G02B 6/0018 |
| 2021/0192889 A1 | 6/2021 | Banas et al. | |
| 2021/0217271 A1 | 7/2021 | Loose | |
| 2022/0114858 A1 | 4/2022 | Coon et al. | |

* cited by examiner

600

GAMING MACHINE HAVING ENHANCED EMOTIVE LIGHTING

RELATED APPLICATIONS

This patent application claims priority benefit to U.S. Provisional Patent Application No. 63/389,997 filed Jul. 18, 2022. The 63/389,997 Application is hereby incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2023, LNW Gaming, Inc.

FIELD

The present disclosure relates generally to gaming systems, apparatus, and methods and, more particularly, to gaming machines having enhanced emotive lighting.

BACKGROUND

The gaming industry incorporates various presentation elements to facilitate and/or enhance gaming experiences in a gaming environment. For example, the gaming industry may incorporate audio, visual, and/or tactile presentation elements into a gaming machine to present a game, indicate changes to the game state, and attract the attention of players and bystanders to the game. These presentation elements may include displays, speakers, player input devices, and/or lighting assemblies. The presentation elements may be operated independently or in combination with each other to present one or more different states of the gaming machine. As the gaming industry matures and gaming environments become further populated with more gaming machines and other devices including presentation elements, new and unique configurations of presentation elements are needed to attract interest to a gaming machine.

Moreover, additional constraints or limitations may affect the configuration of the presentation elements of a gaming machine. For example, the gaming machine may have limited physical space to incorporate presentation elements. In another example, the gaming machine may have functional requirements for the presentation elements, such as a lighting system that emits light in one or more colors matched to the theme or state of a game being presented by the gaming machine. Accordingly, improvements to presentation elements and configurations thereof for gaming machines are needed.

SUMMARY

According to one aspect of the present disclosure, a gaming machine includes a cabinet with an emotive lighting system coupled to the cabinet and logic circuitry. The emotive lighting system includes a plurality of light transmitting fibers, each end of which is position adjacent to a light-emitting device aligned to emit light into its respective fiber end. The light-emitting devices are arranged in an array and the logic circuitry causes each light-emitting device of the array to selectively emit light such that its associated fiber is illuminated.

According to a further aspect of the present disclosure, a method of assembling an emotive lighting system for a gaming machine is provided. The method includes assembling an emotive lighting assembly by coupling each end of a plurality of light-transmitting fibers to a shutter plate having openings adjacent to an array of light-emitting devices mounted on a printed circuit board assembly, each fiber end aligned to allow the light-emitting device to emit light into the fiber end. The method further includes attaching the shutter plate and printed circuit board assembly to a bracket, attaching the bracket to a cabinet of the gaming machine, and covering the emotive lighting assembly with a transparent lens.

Additional aspects of the invention will be apparent to those of ordinary skill in the art in view of the detailed description of various embodiments, which is made with reference to the drawings, a brief description of which is provided below.

Figure 1:
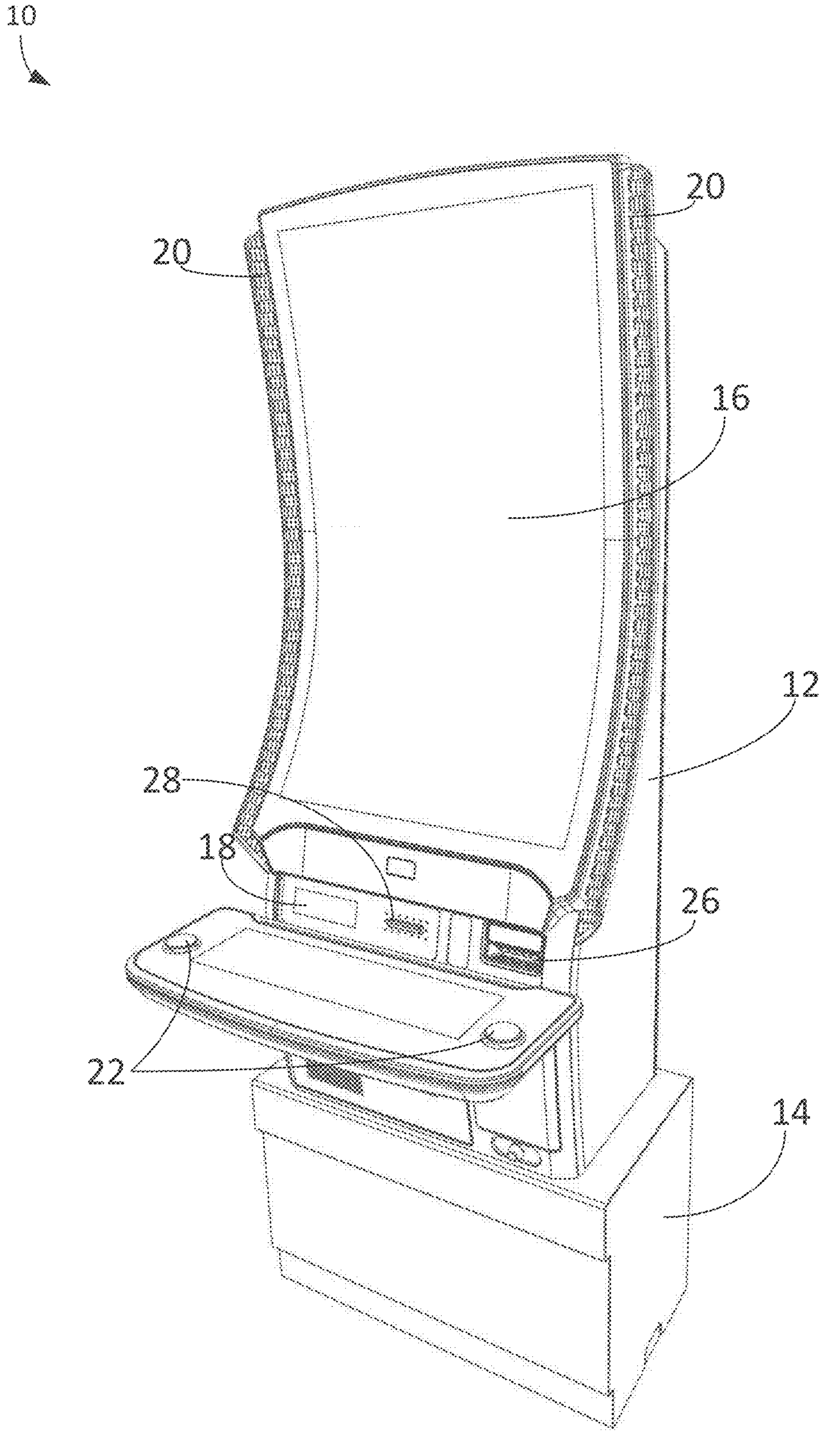
FIG. 1 is a perspective view of a free-standing gaming machine according to an embodiment of the disclosed concepts.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls, and shelves for mounting the internal components and managing the wiring, and one or more front doors that are locked and require a physical or electronic key to gain access to the interior compartment of the cabinet 12 behind the locked door. The cabinet 12 is positioned on a stand 14 to bring the inputs and display of the gaming machine 10 to a predetermined height (e.g., a height for most players to interact with the gaming machine 10 either sitting or standing).

The input devices, output devices, and input/output devices are disposed on, and securely coupled to, the cabinet 12. By way of example, the output devices include a primary display 16, a secondary display 18, one or more emotive lighting assemblies 20 (described further herein), and one or more audio speakers. The primary display 16 may be a mechanical-reel display device, a video display device, or a combination thereof in which a transmissive video display is disposed in front of the mechanical-reel display to portray a video image superimposed upon the mechanical-reel display. The secondary display 18 may be a video display device that supplements that presentation of the primary display 16 or functions as a player tracking interface. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include additional, fewer, or alternative displays, including those described elsewhere herein. For example, the gaming machine 10 may include a touch screen for presenting information to a player and accepting player input. In addition to the touch screen, the gaming machine 10 may include other input and output devices, such as touch screens mounted over the primary or secondary displays, buttons 22 on a button panel, a bill/ticket acceptor and dispenser 26, a card reader/writer 28, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen, buttons 22, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter of a plurality of meters 84 (see FIG. 3). The physical item may be, for example, currency bills, coins, tickets, vouchers, coupons, cards, and/or computer-readable storage mediums. The deposited cash or credits are used to fund wagers placed on the wagering game played via the gaming machine 10.

Examples of value input devices include, but are not limited to, a coin acceptor, the bill/ticket acceptor 26, the card reader/writer 28, a wireless communication interface for reading cash or credit data from a nearby mobile device, and a network interface for withdrawing cash or credits from a remote account via an electronic funds transfer. In response to a cashout input that initiates a payout from the credit balance on the "credits" meter of the plurality of meters 84 (see FIG. 3), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 28, the ticket dispenser 26 for printing tickets redeemable for cash or credits, a wireless communication interface for transmitting cash or credit data to a nearby mobile device, and a network interface for depositing cash or credits to a remote account via an electronic funds transfer.

Figure 2:
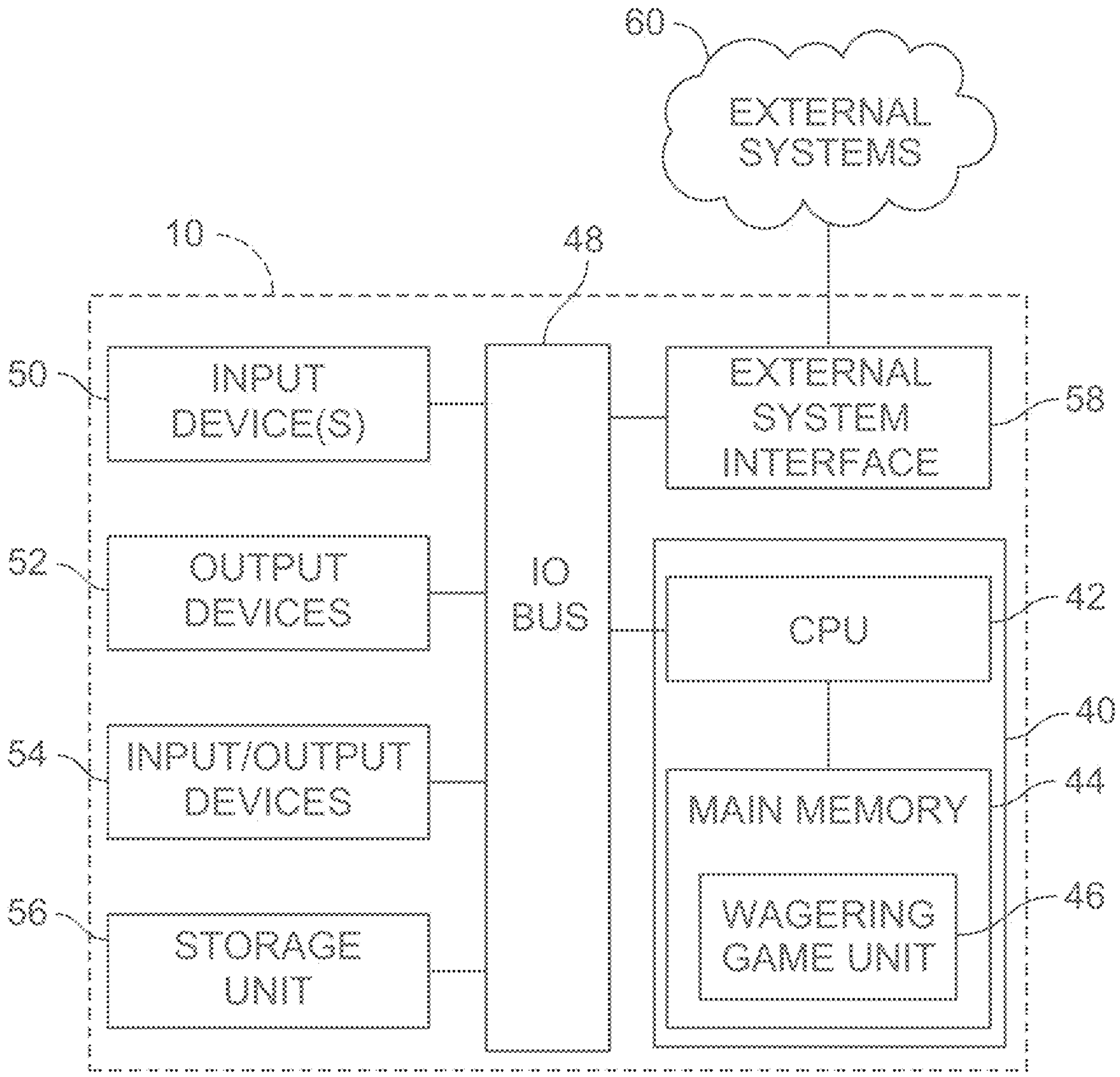
FIG. 2 is a schematic view of a gaming system according to an embodiment of the disclosed concepts.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
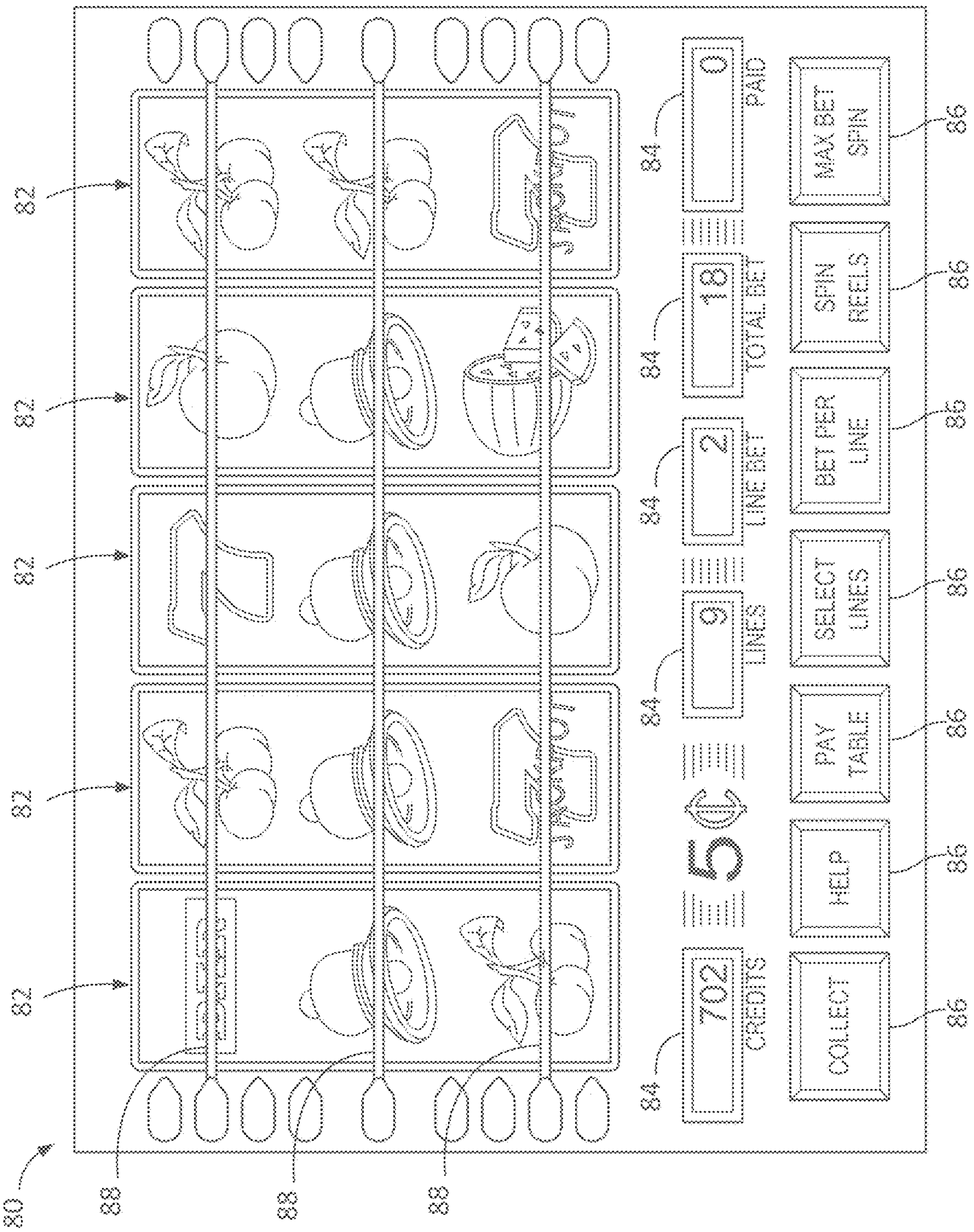
FIG. 3 is an image of an exemplary basic-game screen of a wagering game displayed on a gaming machine, according to an embodiment of the disclosed concepts.

Referring now to FIG. 3, there is illustrated an image of a basic-game screen 80 adapted to be displayed on the primary display 14 or the secondary display 16. The basic-game screen 80 portrays a plurality of simulated symbol-bearing reels 82. Alternatively, or additionally, the basic-game screen 80 portrays a plurality of mechanical reels or other video or mechanical presentation consistent with the game format and theme. The basic-game screen 80 also advantageously displays one or more game-session meters 84 and various touch screen buttons 86 adapted to be actuated by a player. A player can operate or interact with the wagering game using these touch screen buttons or other input devices such as the buttons 22 shown in FIG. 1. The game-logic circuitry 40 operates to execute a wagering-game program causing the primary display 16 to display the wagering game.

In response to receiving an input indicative of a wager covered by or deducted from the credit balance on the "credits" meter 84, the reels 82 are rotated and stopped to place symbols on the reels in visual association with paylines such as paylines 88. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 16 or a secondary display) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 16, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter. In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in or are used in other gaming jurisdictions, including for example GLI Standard #11 of Gaming Laboratories International (which defines a gaming device in Section 1.5) and N.J.S.A 5:12-23, 5:12-45, and all other relevant provisions of the New Jersey Casino Control Act. As can be seen from the description herein, the gaming machine 10 may be regulatorily approved and thus implemented with hardware and software architectures, circuitry, and other special features that differentiate it from general-purpose computers (e.g., desktop PCs, laptops, and tablets).

With reference again to FIG. 1, in the example embodiment, the gaming machine 10 includes an emotive lighting system 20 that is configured to emit light according to one or more sequences to visually enhance gameplay at the gaming machine 10 and/or attract potential players to the gaming machine 10. The emotive lighting system 20 may be communicatively coupled to the game-logic circuitry 40 (or another controller) to facilitate controllable light sequences. In the example embodiment, the emotive lighting system 20 is coupled to the cabinet 12 adjacent to and partially surrounding the primary display 14. In other embodiments, the emotive lighting system 20 may be in a different position and/or orientation on the cabinet 12 relative to the primary display 16. In one example, the emotive lighting system 20 is not positioned on the same surface of the cabinet 12 as the primary display 14, but instead extends along the sides and top surfaces of the cabinet 12, in an input deck area or adjacent "shoulder" area, etc. In other embodiments, the emotive lighting system 20 may have different configurations, including those described elsewhere herein.

Figure 4:
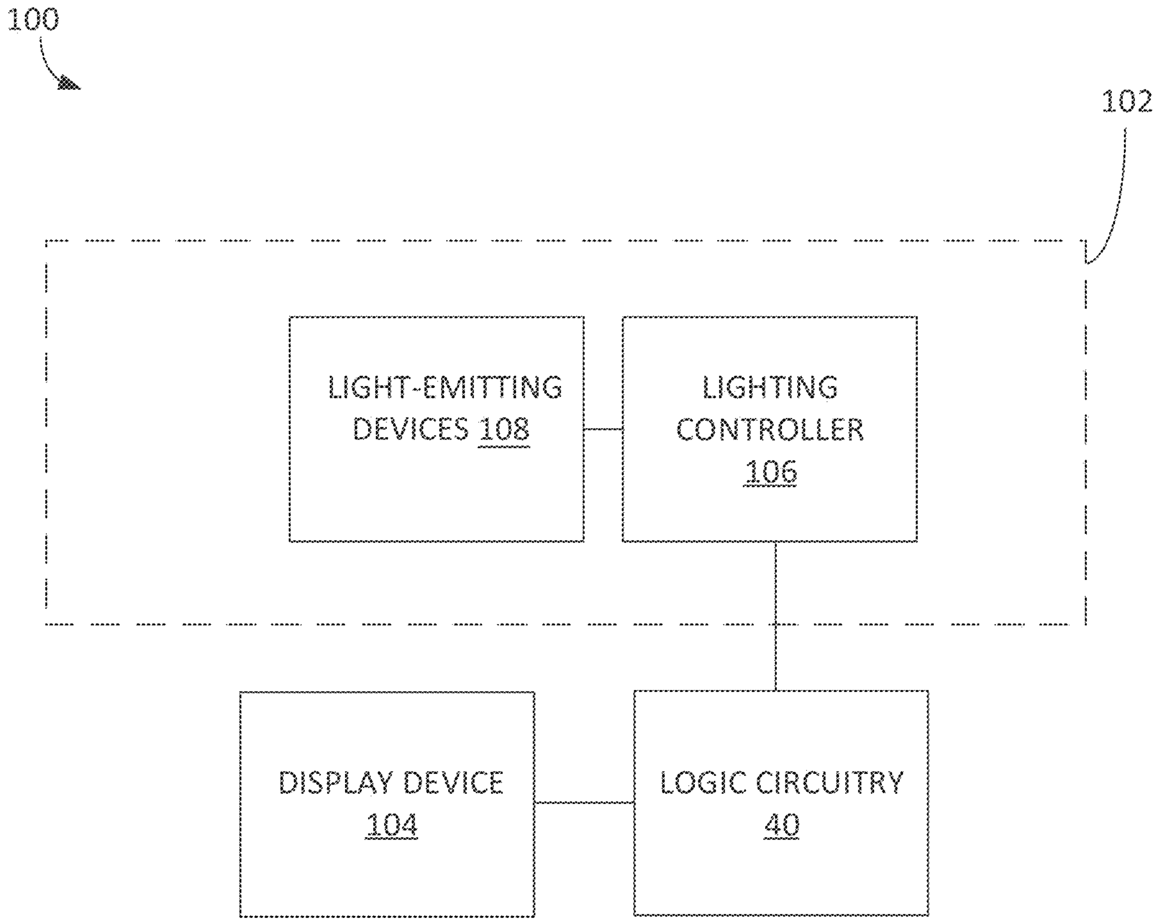
FIG. 4 is a block diagram of an example presentation assembly for a gaming machine, according to one or more embodiments of the present disclosure.

Referring now to FIG. 4, a block diagram of an example presentation assembly 100 for a gaming machine is shown. The presentation assembly 100 is configured to present various information, attractions, and/or features to players and bystanders. The components of the presentation assembly 100 may be mechanically, electrically, and/or communicatively coupled together to form the assembly 100. At least a portion of the presentation assembly 100 may be in communication with the logic circuitry 40 (shown in FIG. 2). In certain embodiments, a gaming machine may include a plurality of presentation assemblies. For example, a gaming machine may include a presentation assembly focused around one or more display devices and a second presentation assembly focused around an input deck. In the example embodiment, the presentation assembly 100 includes an emotive lighting assembly 102 and a display device 104. In other embodiments, the presentation assembly 100 may include additional, fewer, or alternative elements, including those described elsewhere herein. For example, the presentation assembly 100 may include audio output devices, tactile output devices (e.g., vibration motors), additional display devices, and/or additional lighting assemblies.

The emotive lighting assembly 102 is configured to output or emit light according to one or more emotive lighting sequences. The emotive lighting assembly 102 includes a lighting controller 106 and one or more light-emitting devices 108. In other embodiments, the emotive lighting assembly 102 may include additional, fewer, or alternative components.

The lighting controller 106 is electrically and/or communicatively coupled to the light-emitting devices 108 to control the output of light from the emotive lighting assembly 102. For example, the lighting controller 106 may regulate the power transmitted to the light-emitting devices 108 such that the power delivered to the light-emitting devices 108 affects the color, intensity, and/or other light characteristics of the emitted light (including the absence of emitted light by selectively providing no power to the light-emitting devices 108). In another example, the lighting controller 106 transmits data-based commands to the light-emitting devices 108 or an intermediate device to control the emitted light.

In the example embodiment, the lighting controller 106 is a separate device in data communication with the logic circuitry 40 to transmit information relating to the emotive lighting assembly 102 and receive commands to control the emotive lighting assembly 102. For example, the logic circuitry 40 may control the emotive lighting assembly 102 via the lighting controller 106 to emit light according to an emotive lighting sequence based on the state of a game conducted by the logic circuitry 40. The lighting controller 106 may include any suitable hardware and software to facilitate the functions of the lighting controller 106 and the lighting assembly 102 as described herein. For example, the lighting controller 106 may include one or more processors, memory devices, communication devices, power regulation circuitry, and/or other suitable components. In other embodiments, the lighting controller 106 may be integrated with the logic circuitry 40 rather than a separate device. In such embodiments, the logic circuitry 40 may include dedicated hardware and/or software elements to operate as the lighting controller 106. For example, the logic circuitry 40 may include data and/or power wiring to couple to the light-emitting devices 108 to transmit and receive emotive lighting data and power.

The light-emitting devices 108 may be any suitable type or combinations of light-emitting devices. For example, the light-emitting devices 108 may include, without limitation, light-emitting diodes (LEDs), organic LEDs, fluorescent devices, incandescent devices, arc devices, gas discharge devices, laser devices and the like. Each light-emitting device 108 may include one or more light sources. For example, an LED-based light-emitting device may include several clustered LEDs to facilitate emitting multiple colors of light.

As used herein, when referring to a direction of emitted light from a light source, it is to be understood that the emitted light is not limited to the specified direction, but rather a majority of the emitted light is directed towards the specified direction. Additionally, as used herein "activating" a light source refers to the act of selectively powering a light source for a period of time and does not necessarily imply that the light source is continuously powered for the period of time. That is, the duty cycle of the supplied power is greater than 0%, but also less than or equal to 100%.

Figure 5:
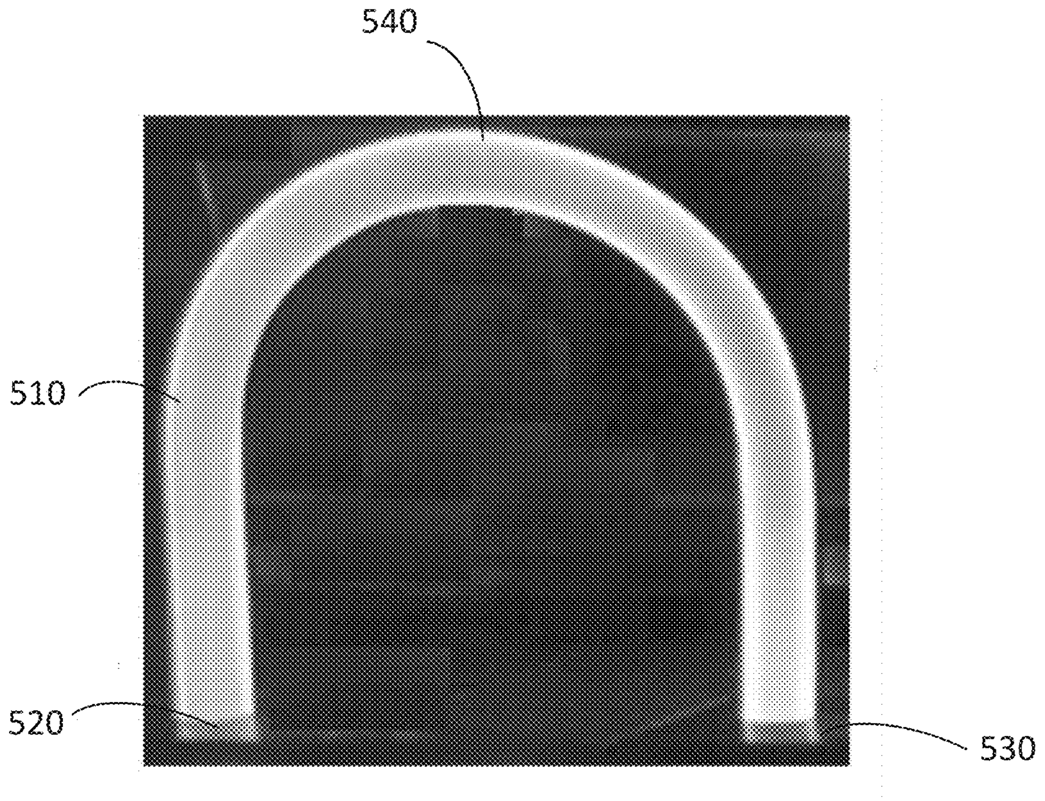
FIG. 5 is an illustration of a single rigid fiber of an emotive lighting system in accordance with one or more embodiments of the disclosed concepts.

In accordance with one or more embodiments, FIG. 5 illustrates a single fiber 510 of an emotive lighting assembly utilizing the disclosed concepts. Each end of the fiber 510 is positioned adjacent to an individual light-emitting device 520, 530. The fiber 510 may be molded out of plastic, for example, polyntethyl methacrylate (PMMA), also known as acrylic or acrylic glass. In some embodiments, light emitted from the fiber may be diffused by a coating applied to the surface of the fiber. For example, without limitation, the coating may be a liquid spray composed of an acrylic resin, butyl acetate solvent, and other additives. The coating may be applied in multiple coats, for example, in an eight-part matte, two-part gloss combination, to achieve the desired diffusion of light from the fiber 510.

Other methods of producing each fiber 510 fall within the spirit and scope of the invention. For example, though preferably rigid, each fiber may be also formed from flexible commercially available fiber, have a formed or molded plastic core with a diffusing sheath applied via a heat-shrink material or an over mold or be formed or molded plastic with a textured surface providing the desired diffusion of light from the fiber 510.

The light-emitting, devices 520, 530 may be light-emitting diodes, or any of the light-emitting devices 108 described above with reference to FIG. 4 and are incorporated into a printed circuit board assembly that allows the logic circuitry 40 to individually address each light-emitting device in order to modify the color and brightness of its emitted light. As shown in FIG. 5, the fiber 510 may be generally U-shaped, having two legs and a curved or arched apex 540 The light-emitting devices may be arranged on the printed circuit board assembly in an array configured such that two ends of each of a plurality of fibers 510 may be aligned with a respective pair of light-emitting devices 520, 530 in the array. Thus, the logic circuitry 40 allows each fiber 510 to be selectively illuminated with light from its aligned light-emitting devices 520, 530.

Figure 6:
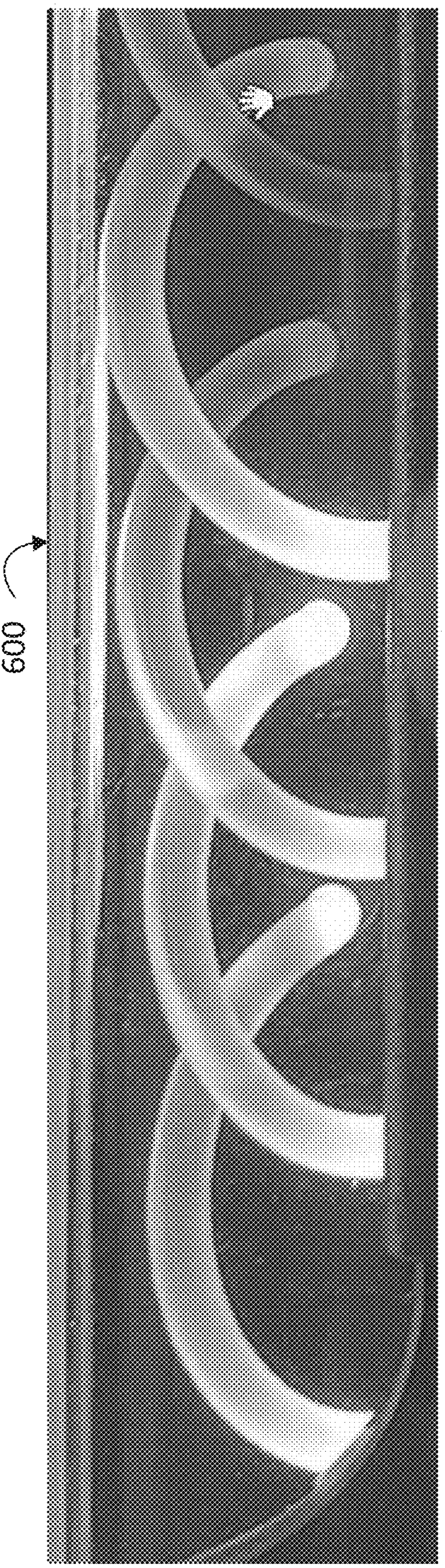
FIG. 6 is an illustration of a plurality of rigid fibers of an emotive lighting system arranged in accordance with one or more embodiments of the disclosed concepts.

As shown in photograph 600 of FIG. 6, in accordance with one or more embodiments, an arrangement of the light-emitting devices in the array on the printed circuit board assembly may position a plurality of the U-shaped fibers (FIG. 5; 510) to create an illusion of a single looping, braided or spiraling fiber. While a single looping or spiraling fiber would, naturally, create a similar visual effect, such an approach has disadvantages overcome by the disclosed concepts. For example, a single looping or spiraling fiber would necessarily be much longer than each single U-shaped fiber 510 and would, thus, require a much brighter light source such as a laser driver. Individually driven light-emitting diodes array on a printed circuit board assembly are much more cost effective than the use of one or more expensive laser drivers used to illuminate significantly longer fibers. Another advantage of using short looping fibers is that each fiber 510 provides two ends to light each segment. This allows the use of two separate light-emitting devices (FIG. 5; 520, 530) to increase the brightness and crispness of the light emitted by each fiber segment. Furthermore, in accordance with some embodiments, a different color may be emitted by the light-emitting device (520, 530) at each end of the fiber. This allows a unique color mixing effect axially down the fiber, with the center point of the apex of the U shape having the highest ratio of color mixing. For example, blue light emitted by the light emitting device 520 at one end of the fiber and yellow light emitted by the light emitting device 530 at the other end of the fiber would result in a gradual transition from yellow to green on the yellow side of the apex 540 and a gradual transition from blue to green at the blue side of the apex. The strongest mix green color would be visible at the apex 540 itself. This effect is multiplied by the number of individual fibers in the emotive lighting assembly, thus, creative use of timing and color selection at each of the light-emitting devices in the array can be used to create a wide variety of interesting visual effects not available from other emotive lighting assemblies.

Figure 7:
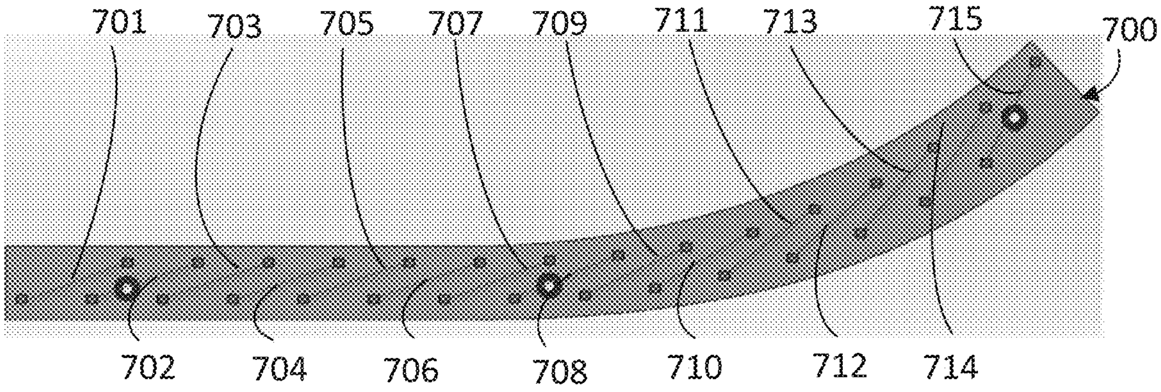
FIG. 7 provides an illustration of a printed circuit board in accordance with one or more embodiments.

FIG. 7 provides an example of a printed circuit board 700 illustrating the locations of matched pairs 701-715 of light-emitting devices 520, 530 (FIG. 5) laid out in an array on the printed circuit board 700 in accordance with one or more embodiments. The line between the two light emitting devices 520, 530 of each matched pair 701, 702, 703, 704, 705, 706, 707, 708, 709, 710, 711, 712, 713, 714 and 715 represents a fiber 510 with each end aligned with its respective light emitting devices 520, 530. Note that the printed circuit board 700 is shaped to conform to a particular part of the gaming machine cabinet and the positions of the matched pairs 701-715 in the array are similarly placed on the circuit board to conform to this shape. The printed circuit board 700 illustrated in FIG. 7 is but one example. One or more circuit boards 700 of varying shapes and sizes may be employed in multiple emotive lighting assemblies on a single gaming machine.

Figure 8:
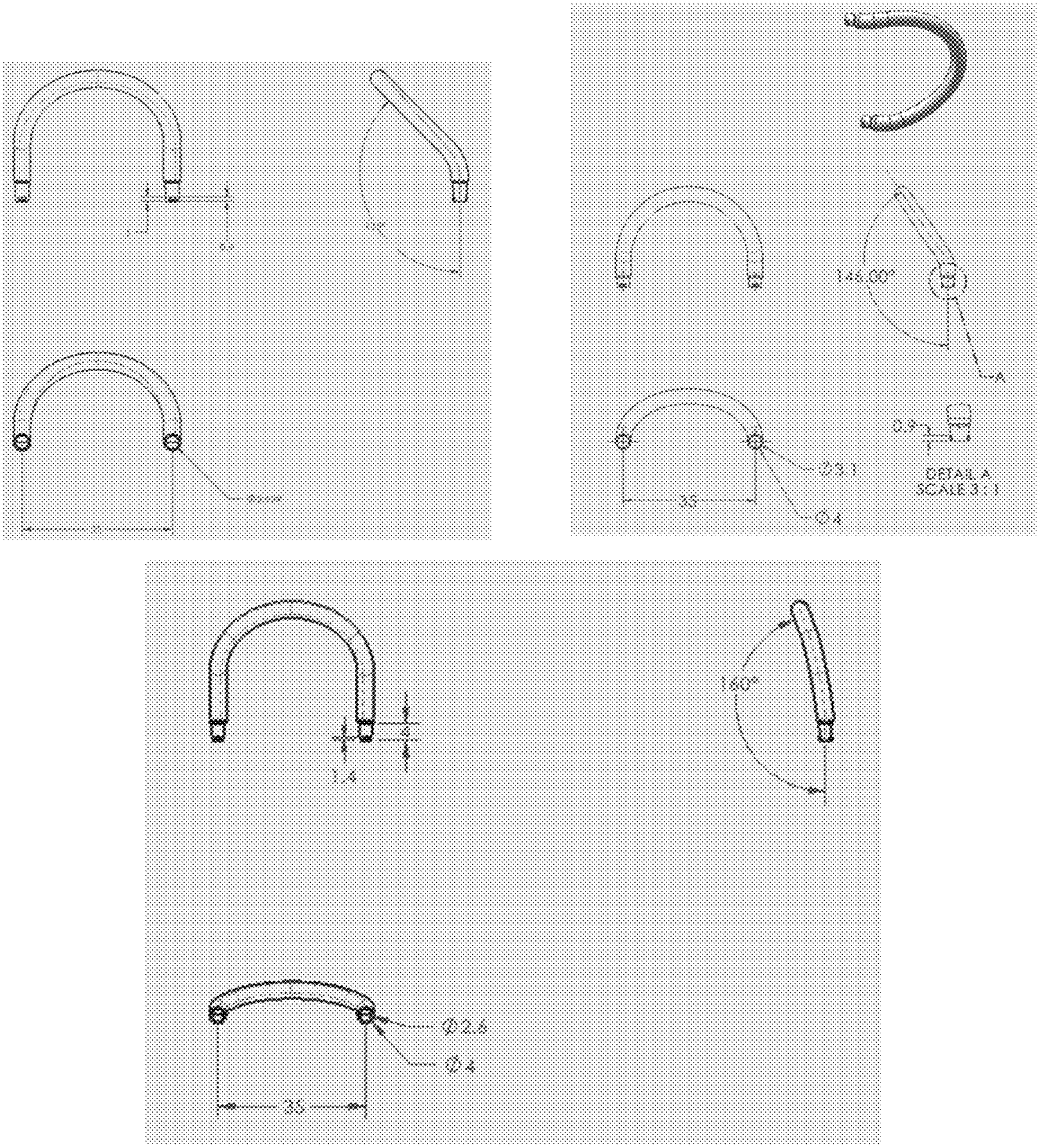
FIG. 8 illustrates various non-limiting examples of fiber shapes in accordance with one or more embodiments.

While the example of generally U-shaped fibers has been used, any molded geometry having two legs and an apex that connects two distinct light sources to provide a color-mixing effect as described falls within the spirit and scope of the invention. In accordance with one or more embodiments, as illustrated by non-limiting examples shown in FIG. 8, the fibers (FIG. 5, 510) of an emotive lighting assembly may be formed as needed to conform to dimensions and shape of the gaming cabinet where the emotive lighting assembly is mounted. For example, the U shape of a fiber may be twisted, one leg may a different length than the length of the other leg or the heights of the various fibers within a particular emotive lighting assembly may vary. In accordance with some embodiments, each of the fibers in a particular emotive lighting assembly has the same height and shape. In accordance with still other embodiments, a single emotive lighting assembly may include fibers having one or more different heights or shapes.

Figure 9A:
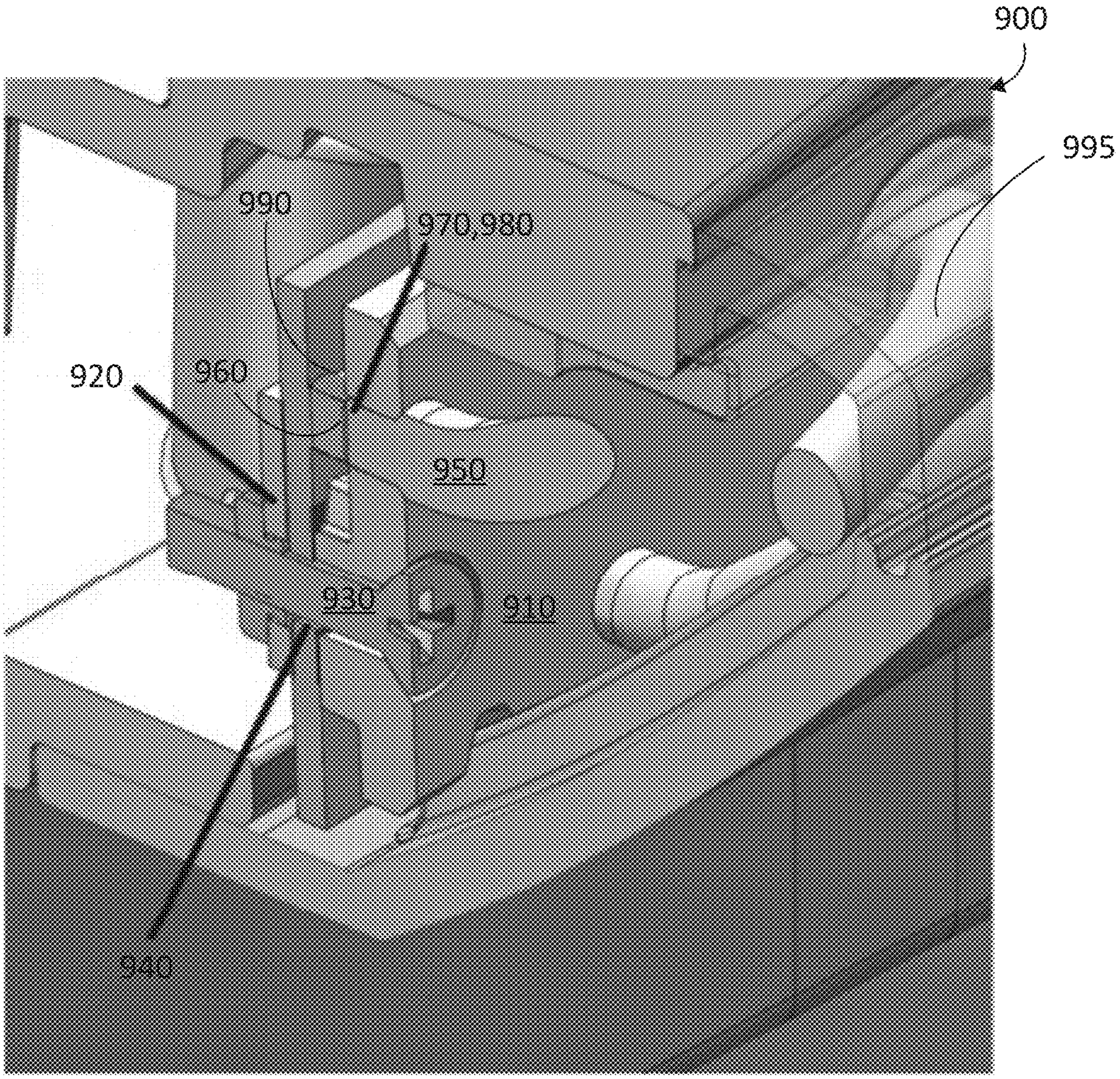
FIGS. 9A-9B illustrate cross sections of two emotive lighting assemblies in accordance with one or more embodiments.
Figure 9B:
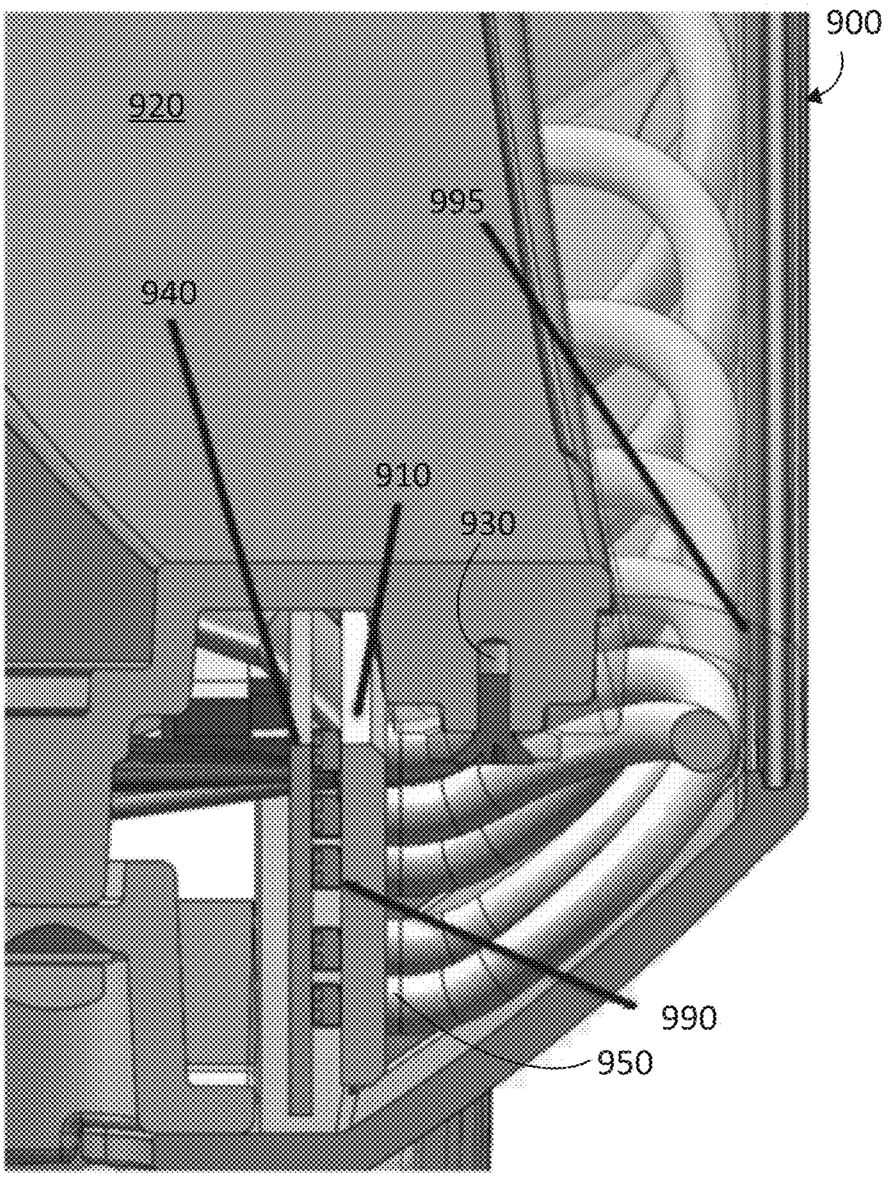

FIGS. 9A-9B provide illustrations of cross sections of two emotive lighting assemblies 900 in accordance with one or more embodiments. While some of the following elements may be omitted in one of FIG. 9A or 9B due to the various angles of each view presented, the basic structure of each emotive lighting assembly is the same. Thus, in FIGS. 9A-9B, like components share like element numbers. In each emotive lighting assembly 900, a printed circuit board assembly (PCBA) 940 is sandwiched between a shutter plate 910 and a bracket 920, then the shutter plate/PCBA sandwich is attached to the bracket 920 by one or more screws 930. Each individual fiber end 950 snaps into a receiving hole 960 in the shutter plate 910 and is held in place by a raised portion 970 of each fiber locking into a matching recess 980 in the shutter plate 910. The receiving hole 960 in the shutter plate 910 is aligned with a light-emitting device 990 of the PCBA 940 such that light emitted by each the light-emitting device 990 is transmitted into the fiber end 950. The shutter plate 910 includes dividers to prevent light from a given light-emitting device 990 from spilling into the fiber end 950 of adjacent light-emitting devices 990. The assembly is covered by a transparent lens 995.

Figure 10:
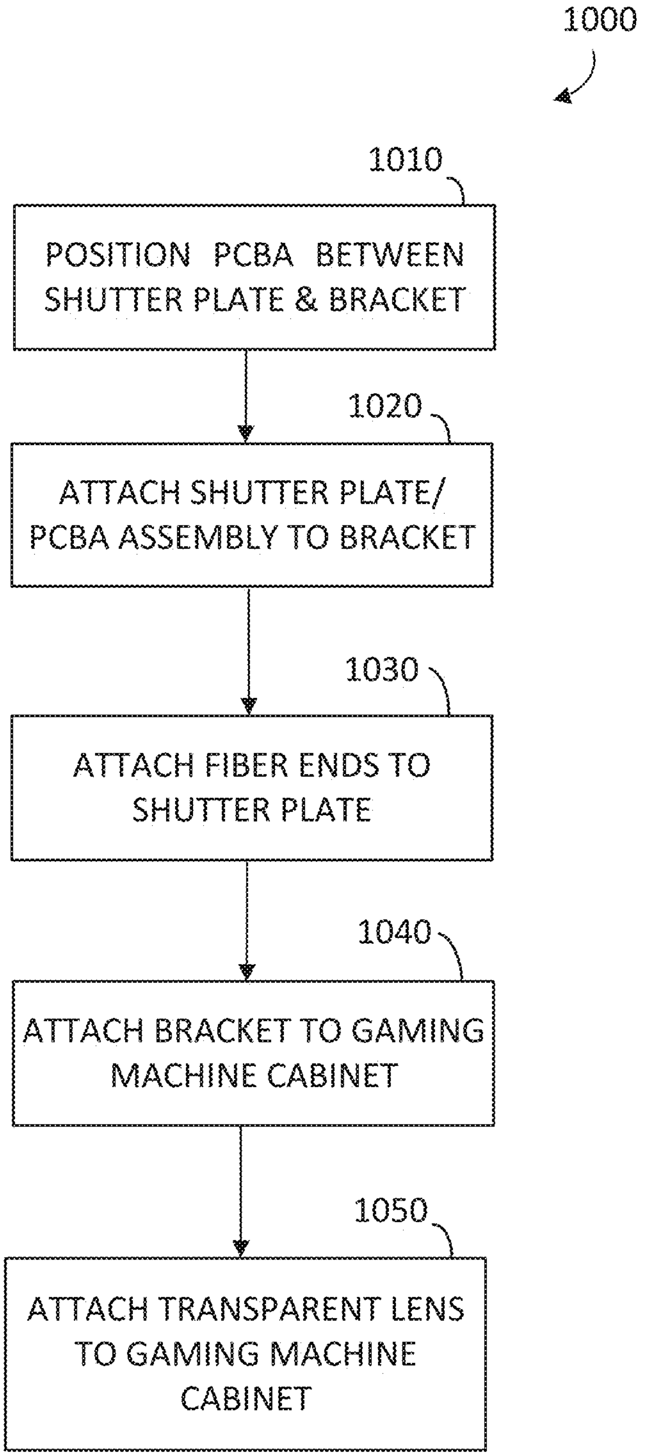
FIG. 10 is a flow diagram of an example method 1000 for assembling an emotive lighting assembly in accordance with one or more embodiments.

FIG. 10 is a flow diagram of an example method 1000 for assembling an emotive lighting assembly, such as the emotive lighting assemblies 900 shown in FIGS. 9A-9B, the elements of which are included for reference in the steps of the method below. The method 1000 may include additional, fewer, or alternative steps to the steps described in relation to FIG. 10, including those described elsewhere herein.

At step 1010, the printed circuit board assembly (PCBA) 940 is positioned between a shutter plate 910 and a bracket 920.

At step 1020, the shutter plate/PCBA assembly is attached to the bracket with one or more screws 930.

At step 1030, the individual fibers are attached to the shutter plate 910. Each individual fiber end 950 snaps into a receiving hole 960 in the shutter plate 910 and is held in place by a raised portion 970 of each fiber locking into a matching recess 980 in the shutter plate 910.

At step 1040, the assembled shutter plate (with attached fibers)/PCBA/bracket assembly is attached to the gaming machine cabinet by screws or other fastening means.

At step 1050, a transparent lens is attached to the gaming machine cabinet.

The order of the steps of the method 1000 may be altered. For example, in some embodiments, the transparent lens may be attached to the assembled shuttle plate/PCBA/bracket assembly prior to the bracket being attached to the gaming machine cabinet. In other embodiments, the fibers may be attached to the shutter plate prior to sandwiching the PCBA between the shutter plate and the bracket. In some embodiments, especially, but not limited to, smaller emotive lighting assemblies, the shutter plate and attached fibers may be molded as one piece, eliminating the need to attach the individual fibers to the shutter plate. Other variations will be obvious to those skilled in the art and fall within the scope of the invention.

Figure 11:
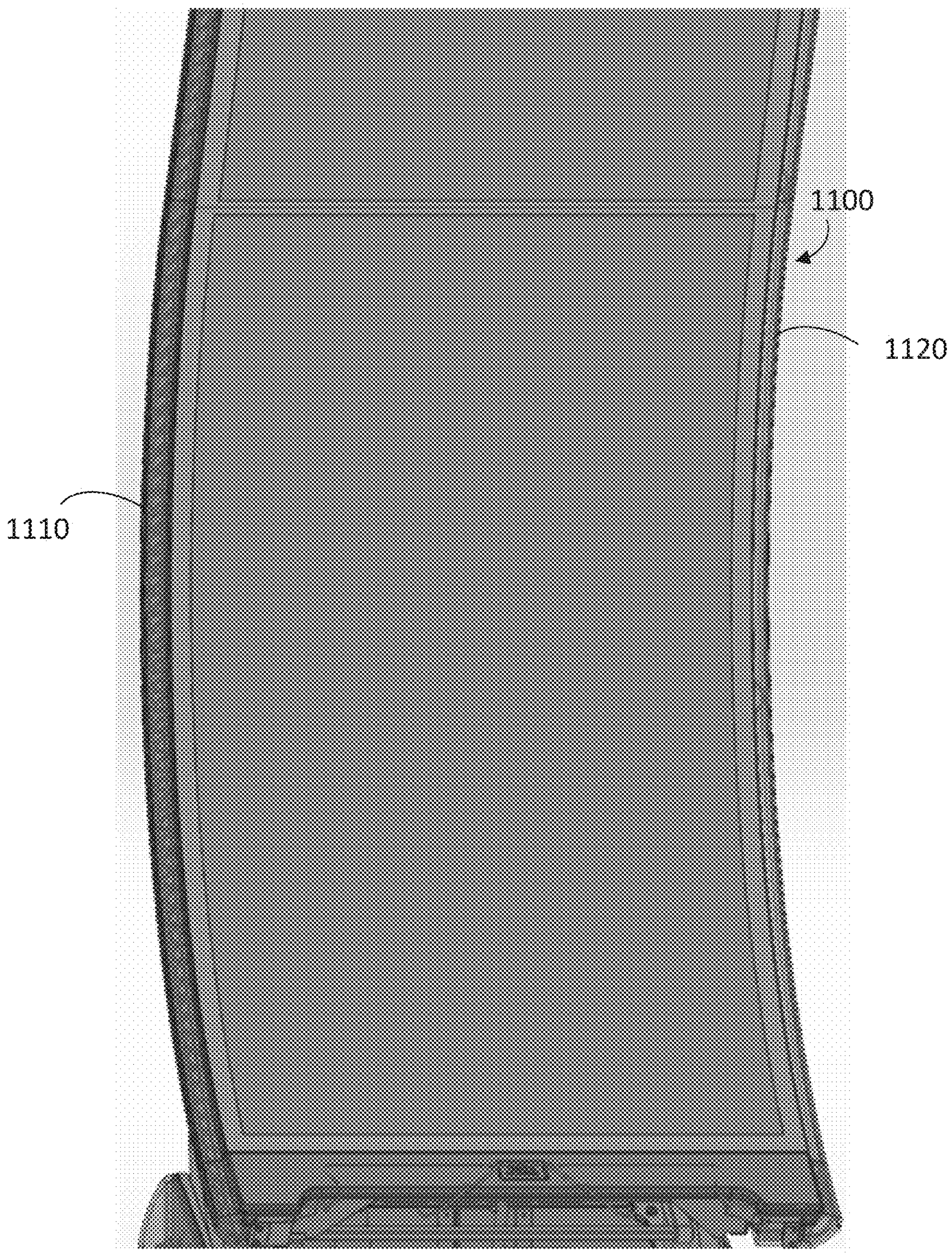
FIG. 11 is a perspective view of a gaming machine primary display including an emotive lighting assembly in accordance with one or more embodiments.

FIG. 11 is a perspective view isolating a primary display 1100 (FIG. 1, 16) and two emotive lighting assemblies (FIG. 1; 20) 1110, 1120 in accordance with one of more embodiments.

Figure 12:
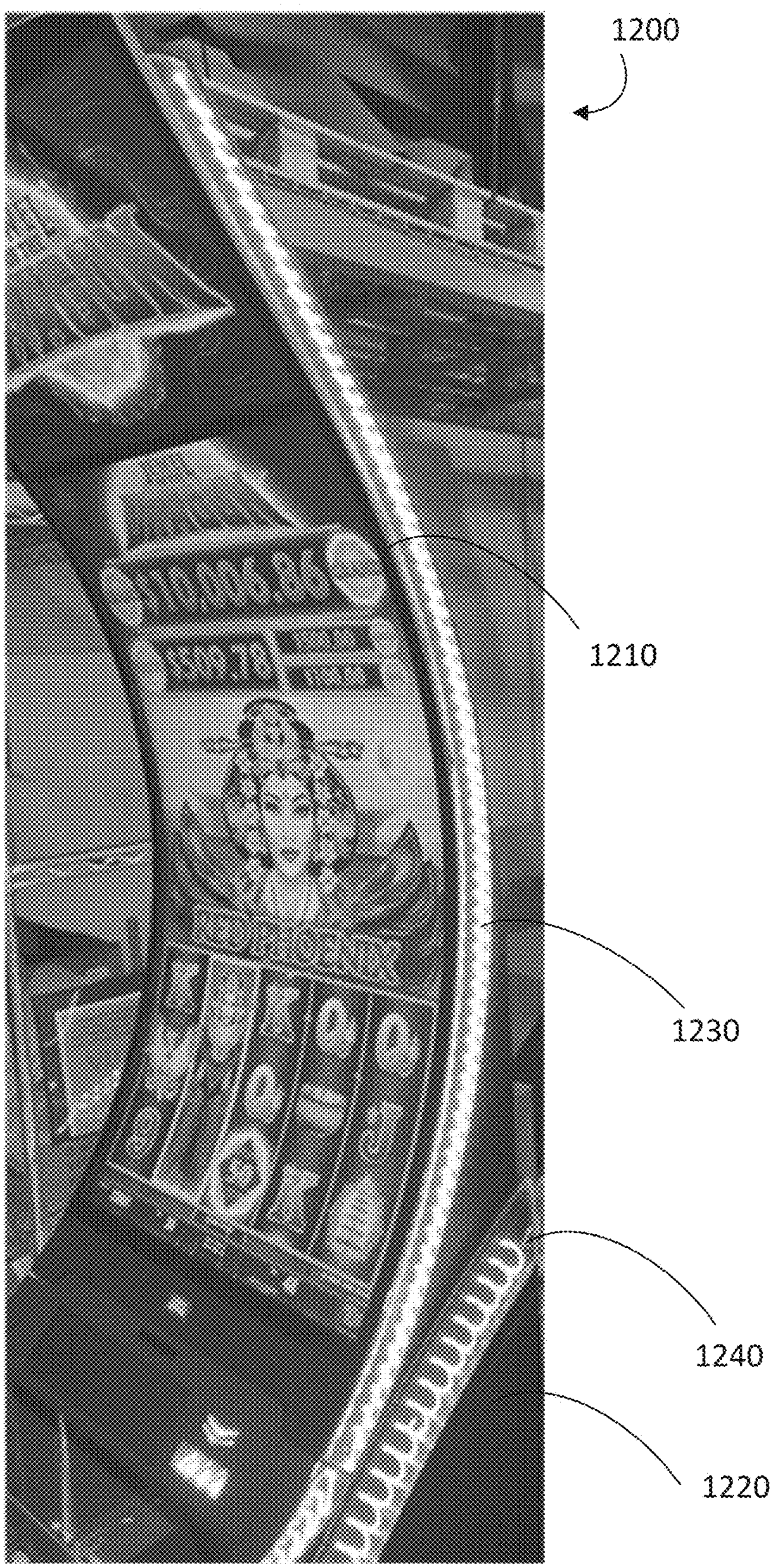
FIG. 12 is a photograph of a gaming machine providing a perspective view of emotive lighting systems in the main monitor and shoulder areas of a gaming machine according to an embodiment of the disclosed concepts.

FIG. 12 is a photograph 1200 of a gaming machine including a primary display 1210 (FIG. 1; 16) attached to a gaming cabinet 1220 (FIG. 1; 12). One emotive lighting assembly 1230 is shown coupled to the primary display 1210. A second emotive lighting assembly 1240 is shown coupled to the shoulder area of the gaming cabinet 1220. As described above, each of the emotive lighting assemblies 1230, 1240 may differ in shape and size to conform to the area of the gaming cabinet 1220 to which they are attached.

Figure 13A:
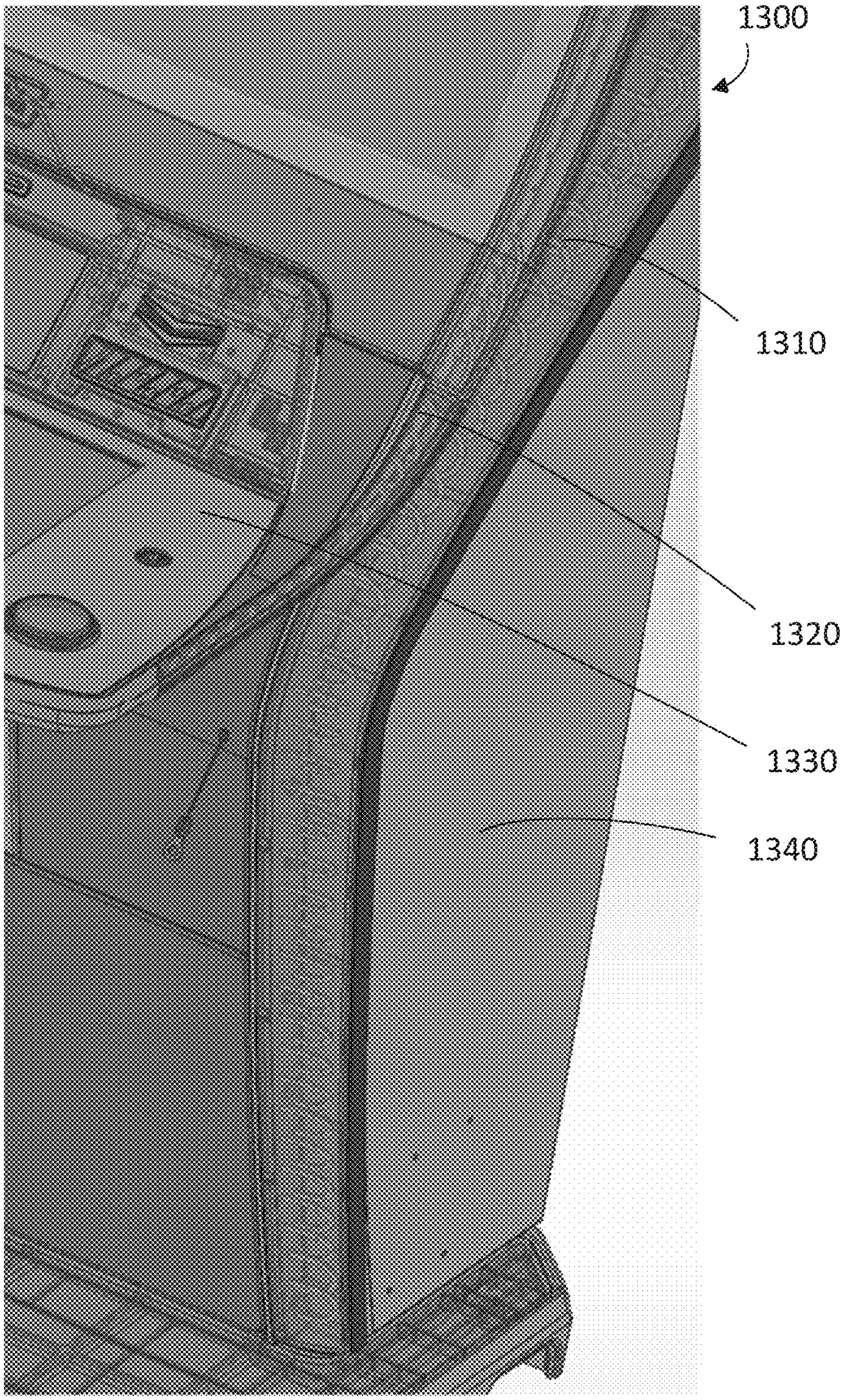
FIG. 13A is a perspective view of a portion of an emotive lighting system in the deck and cabinet area of a gaming machine according to an embodiment of the disclosed concepts.

FIG. 13A is a perspective view 1300 of two emotive lighting assemblies attached to a gaming cabinet 1340 (FIG. 1; 12). One emotive lighting assembly 1320 is shown coupled to the shoulder of the gaming cabinet 1340. A second emotive lighting assembly 1310 is shown coupled to the button panel 1330 of the gaming cabinet 1340. The example of the two emotive lighting assemblies 1310, 1320 demonstrates that, as described above with reference to FIG. 7, the shape and size of the printed circuit board assembly and the layout of the array of fibers on the printed circuit board assembly may be altered to conform to the shape of the component of the gaming cabinet 1340 to which its emotive light assembly is attached. Further, as described above, the shape, width, or height of each individual fiber in an emotive lighting assembly may be different in order to conform to the shape of the area of the gaming cabinet 1340 to which it is attached.

Figure 13B:
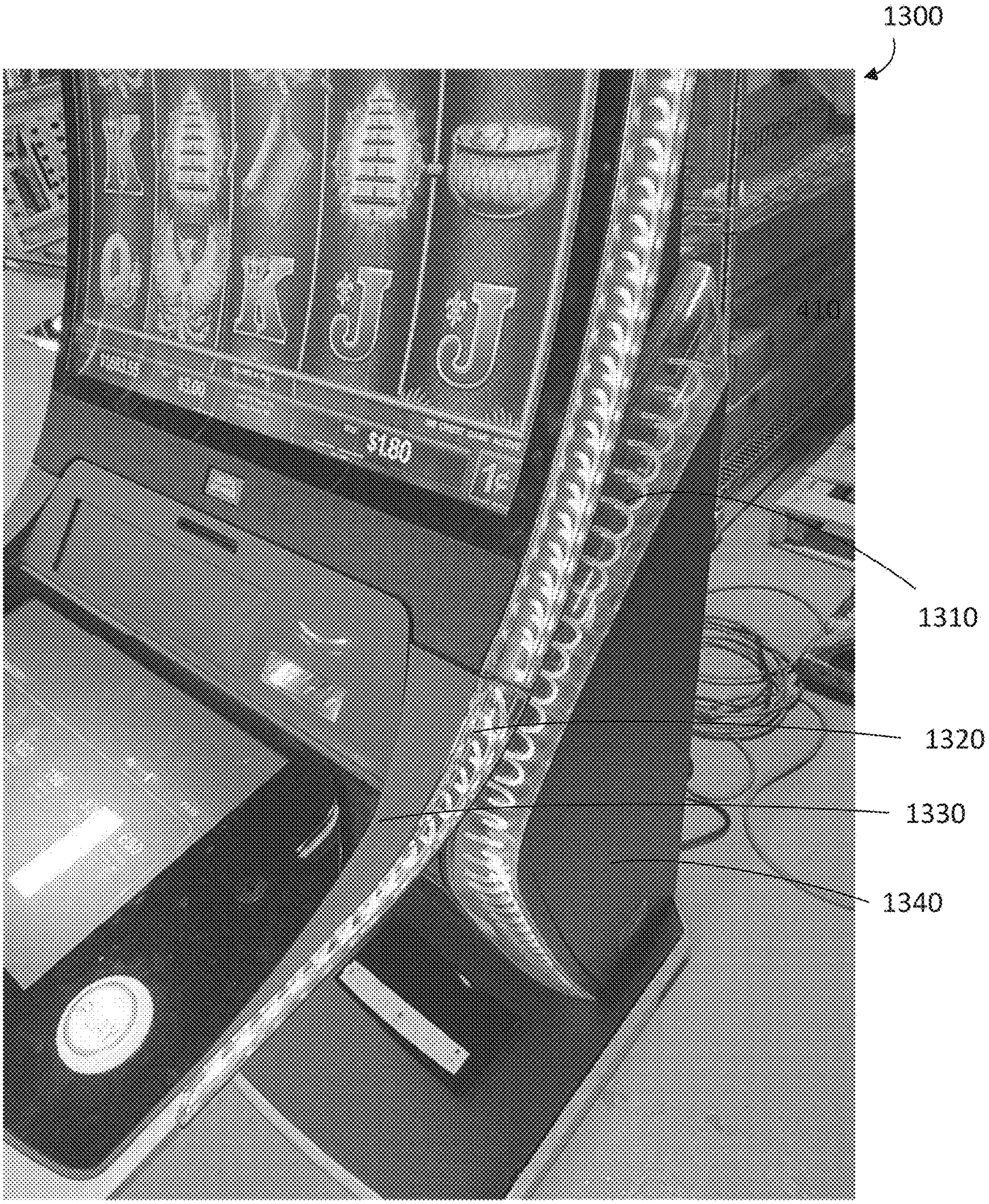
FIG. 13B is a photograph of a gaming machine further illustrating the view provided by FIG. 13A.

FIG. 13B is a photograph further illustrating the example of FIG. 13A.

In this description, numerous specific details are set forth. However, it is understood that embodiments of the invention may be practiced without these specific details. In other instances, well-known circuits, structures, and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Block diagrams illustrate exemplary embodiments of the invention. Flow diagrams illustrate operations of the exemplary embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel or in a different sequence.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.CLAIMS:

What is claimed is:

1. A gaming machine comprising:

a cabinet; and an emotive lighting system coupled to the cabinet, the emotive lighting system comprising:

a plurality of translucent fibers, each fiber comprising a first end, a second end, two legs, and an apex extending between the two legs;

an array of light-emitting devices, wherein a pair of light-emitting devices from the array of light-emitting devices is associated with each fiber of the plurality of fibers;

a shutter plate having a plurality of receiving holes, wherein the first end and the second end of each fiber are attached to the shutter plate within a respective pair of the receiving holes to align one of the pair of associated light-emitting devices with the first end and to align the other of the pair of associated light-emitting devices with the second end; and logic circuitry configured to cause each light-emitting device of the array of light-emitting devices to selectively emit light such that each fiber of the plurality of fibers is selectively illuminated by its pair of associated light-emitting devices.

2. The gaming machine of claim 1, wherein the array of light-emitting devices comprises light-emitting diodes mounted to a printed circuit board assembly.

3. The gaming machine of claim 2, wherein the printed circuit board assembly is positioned between the shutter plate and a bracket attached to the cabinet.

4. The gaming machine of claim 1, wherein light emitted by at least one light-emitting device aligned to guide light into the first end of one of the plurality of fibers differs in color from light emitted by the light-emitting device aligned to guide light into the second end of the one of the plurality of fibers.

5. The gaming machine of claim 1, wherein the length of the legs of each of the plurality of fibers is the same.

6. The gaming machine of claim 1, wherein the length of the legs of at least one of the plurality of fibers is different from the length of the legs of another of the plurality of fibers.

7. The gaming machine of claim 1, wherein the shape of each of the plurality of fibers is the same.

8. The gaming machine of claim 1, wherein the shape of at least one of the plurality of fibers differs from the shape of another of the plurality of fibers.

9. The gaming machine of claim 1, wherein the logic circuitry is configured to cause the array of light-emitting devices to selectively emit light according to a sequence.

10. A method of assembling an emotive lighting assembly for a gaming machine, the gaming machine comprising a cabinet, the method comprising:

- positioning a printed circuit board assembly comprising a plurality of light-emitting devices between a shutter plate and a bracket;
- attaching the shutter plate and the printed circuit board to the bracket;
- attaching a first end and a second end of each of a plurality of fibers to the shutter plate;
- attaching the bracket to the cabinet; and
- attaching a transparent lens to the cabinet.

11. The method of claim 10, wherein the first end and the second end of each of the plurality of fibers is aligned with a respective pair of the plurality of light-emitting devices by the shutter plate.

12. The method of claim 10, wherein the first end and the second end of each fiber are attached to the shutter plate by snapping the first end and the second end into a corresponding receiving hole in the shutter plate.

13. The method of claim 10, wherein each of the plurality of fibers comprises two legs and an apex extending between the two legs.

14. The method of claim 13, wherein the length of the legs of each of the plurality of fibers is the same.

15. The method of claim 13, wherein the length of the legs of at least one of the plurality of fibers is different from the length of the legs of another of the plurality of fibers.

16. The method of claim 10, wherein light emitted by at least one light-emitting device aligned to guide light into the first end of one of the plurality of fibers differs in color from light emitted by the light-emitting device aligned to guide light into the second end of the one of the plurality of fibers.

17. The method of claim 10, wherein the light-emitting devices comprise light-emitting diodes arranged in an array on the printed circuit assembly.

18. A method of operating an emotive lighting system for a gaming machine, the emotive lighting system comprising a plurality of translucent fibers comprising a first end and a second end, wherein each of the plurality of fibers comprises two legs and an apex extending between the two legs, an array of light-emitting devices, a shutter plate having a plurality of receiving holes, wherein the first end and the second end of each of the plurality of fibers is attached to the shutter plate within a respective pair of the receiving holes such that a pair of light-emitting devices from the array is aligned with the first end and the second end of each fiber, and logic circuitry configured to cause each light-emitting device of the array of light-emitting devices to selectively emit light such that each fiber of the plurality of fibers is selectively illuminated by one or both of its associated light-emitting devices, the method comprising the operations of:

for a given one of the plurality of fibers:

- emitting light of a first color into the first end of the given fiber by a first light-emitting device of the array associated with the given fiber; and
- emitting light of a second color into the second end of the given fiber by a second light-emitting device of the array associated with the given fiber, the second color being different from the first color, to produce a range of colors axially along the given fiber based on a mixing of the first and second colors.

19. The method of claim 18, wherein each leg of the given fiber has a lower ratio of color mixing than the ratio of color mixing at the apex of the given fiber.

20. The method of claim 18, wherein the array of light-emitting devices comprises light-emitting diodes mounted to a printed circuit board assembly.

21. The method of claim 18, wherein the logic circuitry is configured to cause the array of light-emitting devices to selectively emit light according to a sequence.

* * * * *